(12) United States Patent
Modarres et al.

(10) Patent No.: US 9,405,369 B2
(45) Date of Patent: Aug. 2, 2016

(54) SIMULATION OF TANGIBLE USER INTERFACE INTERACTIONS AND GESTURES USING ARRAY OF HAPTIC CELLS

(71) Applicant: IMMERSION CORPORATION, San Jose, CA (US)

(72) Inventors: Ali Modarres, San Jose, CA (US); Juan Manuel Cruz-Hernandez, Montreal (CA); Danny A. Grant, Laval (CA); Vincent Levesque, Montreal (CA)

(73) Assignee: Immersion Corporation, Inc., San Jose, CA (US)

( * ) Notice: Subject to any disclaimer, the term of this patent is extended or adjusted under 35 U.S.C. 154(b) by 10 days.

(21) Appl. No.: 14/262,482

(22) Filed: Apr. 25, 2014

(65) Prior Publication Data

US 2014/0320436 A1    Oct. 30, 2014

Related U.S. Application Data

(60) Provisional application No. 61/816,605, filed on Apr. 26, 2013.

(51) Int. Cl.
| | |
|---|---|
| G06F 3/01 | (2006.01) |
| G06F 3/0488 | (2013.01) |
| G06F 1/16 | (2006.01) |
| G06F 3/041 | (2006.01) |

(52) U.S. Cl.
CPC ............... *G06F 3/016* (2013.01); *G06F 1/163* (2013.01); *G06F 1/1641* (2013.01); *G06F 1/1643* (2013.01); *G06F 1/1652* (2013.01); *G06F 3/0412* (2013.01); *G06F 3/0416* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 5,222,895 | A | 6/1993 | Fricke |
| 5,717,423 | A | 2/1998 | Parker |

(Continued)

FOREIGN PATENT DOCUMENTS

| | | |
|---|---|---|
| JP | 2000-148393 | 5/2000 |
| JP | 2002-157087 | 5/2002 |
| JP | 2003-186622 | 7/2003 |

OTHER PUBLICATIONS

International Search Report and Written Opinion of the International Searching Authority issued in International Patent Application No. PCT/US2014/035508, dated Sep. 23, 2014.

(Continued)

*Primary Examiner* — Kent Chang
*Assistant Examiner* — Nathan Brittingham
(74) *Attorney, Agent, or Firm* — Merchant & Gould P.C.

(57) ABSTRACT

A user interface device includes a flexible layer comprising a touch surface configured to receive a touch by a user, a plurality of haptic cells covered by the flexible layer, each haptic cell comprising a haptic output device, a sensor configured to sense an amount and/or rate of deformation of the flexible layer when a user touches the touch surface, and a processor configured to receive an output signal from the sensor, generate a haptic control signal based on the output signal from the sensor, and output the haptic control signal to at least one haptic output device of the plurality of haptic cells to cause the haptic output device to deform an associated haptic cell in response to the sensed deformation of the flexible layer.

18 Claims, 8 Drawing Sheets

(56) References Cited

U.S. PATENT DOCUMENTS

| | | |
|---|---|---|
| 6,303,008 B1 | 10/2001 | Pichulo et al. |
| 6,337,678 B1 | 1/2002 | Fish |
| 6,693,516 B1 | 2/2004 | Hayward |
| 6,819,312 B2 | 11/2004 | Fish |
| 6,940,485 B2 | 9/2005 | Noolandi |
| 7,113,177 B2 | 9/2006 | Franzen |
| 7,138,985 B2 | 11/2006 | Nakajima |
| 7,245,292 B1 | 7/2007 | Custy |
| 7,352,356 B2 | 4/2008 | Roberts et al. |
| 7,382,357 B2 | 6/2008 | Panotopoulos et al. |
| 2002/0054060 A1 | 5/2002 | Schena |
| 2003/0151597 A1 | 8/2003 | Roberts et al. |
| 2005/0030292 A1 | 2/2005 | Diederiks |
| 2005/0040962 A1 | 2/2005 | Funkhouser et al. |
| 2005/0057528 A1 | 3/2005 | Kleen |
| 2005/0285846 A1 | 12/2005 | Funaki |
| 2006/0115348 A1 | 6/2006 | Kramer |
| 2006/0197750 A1 | 9/2006 | Kerr et al. |
| 2006/0282170 A1 | 12/2006 | Hardwick et al. |
| 2007/0182718 A1 | 8/2007 | Schoener et al. |
| 2007/0236478 A1 | 10/2007 | Geaghan et al. |
| 2008/0297475 A1 | 12/2008 | Woolf et al. |
| 2009/0002328 A1 | 1/2009 | Ullrich et al. |
| 2009/0128503 A1 | 5/2009 | Grant et al. |
| 2011/0261021 A1 | 10/2011 | Modarres et al. |

OTHER PUBLICATIONS

TactaPad: www.tactiva.com, 6 pages.

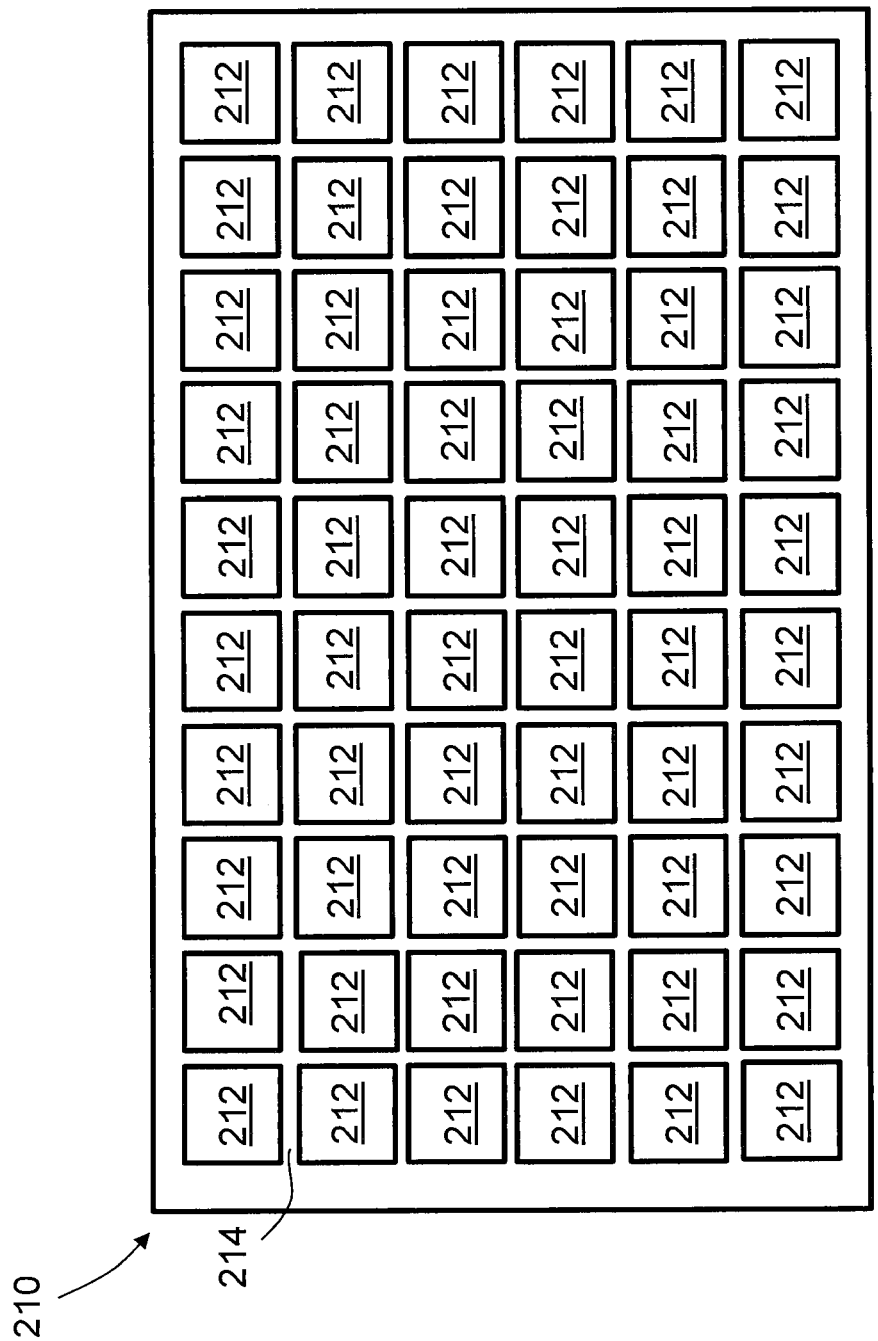

SIMULATION OF TANGIBLE USER INTERFACE INTERACTIONS AND GESTURES USING ARRAY OF HAPTIC CELLS

CROSS-REFERENCE TO RELATED APPLICATIONS

This application claims the benefit of priority to U.S. Provisional Patent Application No. 61/816,605, filed Apr. 26, 2013, the entire content of which is incorporated herein by reference.

FIELD

The present invention is directed to the simulation of tangible user interface interactions and gestures using an array of haptic cells.

BACKGROUND

Current user interfaces in the form of touchscreens use audio, video, and in some cases vibrotactile haptics, to display digital information to a user. Current implementations of touchscreens also typically require constant visual attention for interaction. Although tangible (i.e. physical) user interface elements can facilitate user interface interactions, particularly in visually occupied scenarios, such as driving, user interface interactions and gestures that are currently implemented in digital, devices typically lack in physical and realism aspects.

It is desirable to increase the range of applications of haptically enabled touchscreens, such as increasing the perceived resolution of the touchscreen and expanding the breadth and depth of the haptic information that can be delivered by such touchscreens. It is also desirable to enhance the fidelity and realism of user interface interactions and gestures through physical simulation of the user interface elements to create tangible and efficient interactions/interfaces, and to improve the user experience.

SUMMARY

According to an aspect of the present invention, therein is provided a user interface device that includes a flexible layer comprising a touch surface configured to receive a touch by a user, a plurality of haptic cells covered by the flexible layer, each haptic cell comprising a haptic output device, a sensor configured to sense an amount and/or rate of deformation of the flexible layer when a user touches the touch surface, and a processor configured to receive an output signal from the sensor, generate a haptic control signal based on the output signal from the sensor, and output the haptic control signal to at least one haptic output device of the plurality of haptic cells to cause the haptic output device to deform an associated haptic cell in response to the sensed deformation of the flexible layer.

In an embodiment, the processor is configured to output a plurality of haptic control signals to a plurality of haptic output devices located in proximity to one another to collectively create a haptic effect.

In an embodiment, the haptic effect simulates a button or a joystick.

In an embodiment, at least two of the plurality of haptic output devices create different amounts of deformations of their associated haptic cells to create the haptic effect.

In an embodiment, the processor is configured to generate a plurality of haptic control signals based on the output signal from the sensor and output the haptic control signals to a plurality of haptic output devices sequentially to create a haptic effect.

In an embodiment, the haptic effect simulates a wave or a ripple. In an embodiment, the haptic effect simulates movement of a joystick or a slider.

In an embodiment, the processor is configured to generate a second haptic control signal different than the haptic control signal and output the second haptic control signal to the haptic output device to cause the haptic output device to output a vibrotactile haptic effect.

In an embodiment, the user interface device further includes a pressure sensor configured to sense a resistance displayed by the haptic cell to the user at the touch surface. In an embodiment, the processor is configured to change the haptic control signal based on the sensed resistance displayed by the haptic cell.

According to an aspect of the present invention, there is provided a method that includes sensing an amount and/or rate of displacement of a flexible layer of a user interface device, generating a haptic control signal based on the sensed amount and/or rate of displacement of the flexible layer with a processor, and deforming a haptic cell with a haptic output device based on the haptic control signal.

In an embodiment, the method includes generating a plurality of haptic control signals and deforming a plurality of haptic cells located in proximity to each other with a plurality of haptic output devices based on the plurality of haptic control signals to collectively create a haptic effect. In an embodiment, at least two of the haptic cells are deformed by different amounts to create the haptic effect.

In an embodiment, the method includes generating a plurality of haptic control signals and sequentially deforming a plurality of haptic cells located in proximity to each other with a plurality of haptic output devices based on the plurality of haptic control signals to collectively create a haptic effect.

In an embodiment, the method includes generating a second haptic control signal different than the haptic control signal and generating a vibrotactile haptic effect with the haptic output device.

In an embodiment, the method includes sensing a resistance displayed by the haptic cell to a user of the user interface device. In an embodiment, the method includes changing the haptic control signal based on the sensed resistance displayed by the haptic cell.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIG. 3 is a schematic top view of the user interface of FIG. 2;

DETAILED DESCRIPTION

Figure 1:
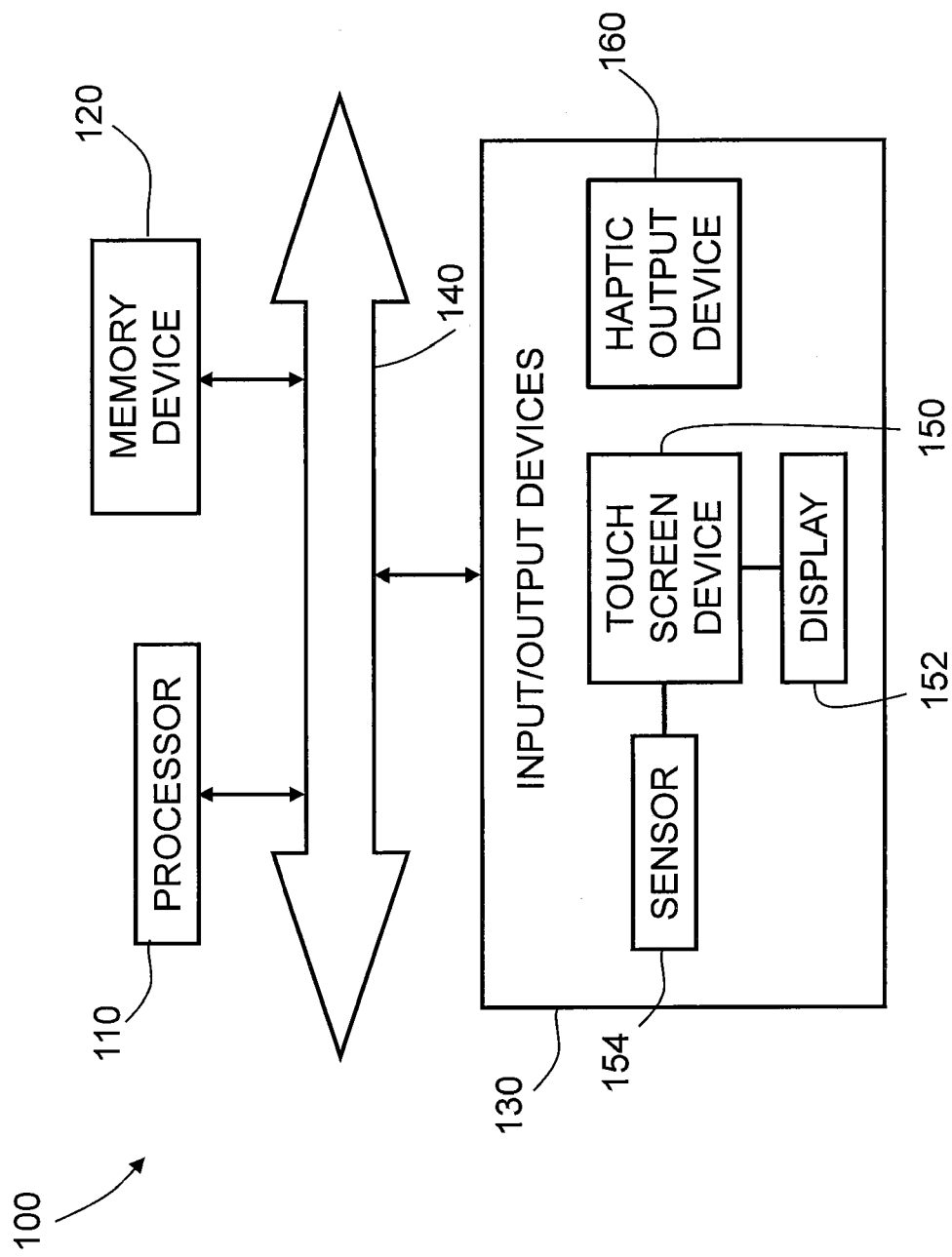
FIG. 1 is a schematic illustration of a system according to embodiments of the invention.

FIG. 1 is a schematic illustration of a system 100 in accordance with an embodiment of the invention. As illustrated, the system 100 includes a processor 110, a memory device 120, and input/output devices 130, which are interconnected via a bus 140. In an embodiment, the input/output devices 130 may include a touchscreen device 150, a haptic output device 160 and/or other input devices that receive input from a user of the system 100 and output devices that output information to the user of the system 100. In an embodiment, the system 100 may be a user interface in the form of a touch mobile or tablet device that includes all of the components illustrated in FIG. 1 in a single integrated device.

The touchscreen device 150 may be configured as any suitable user interface or touch/contact surface assembly and may be configured for physical interaction with a user-controlled device, such as a stylus, finger, etc. In some embodiments, the touchscreen device 150 may include at least one output device and at least one input device. For example, the touchscreen device 150 may include a visual display 152 configured to display, for example, images and a touch sensitive screen comprising at least one sensor 154 superimposed thereon to receive inputs from a user's finger or stylus controlled by the user. The visual display 152 may include a high definition display screen.

The sensor 154 may include a strain gauge sensor to measure the deformation magnitude during interactions between the user and the touchscreen device 150, a force-sensitive resistor ("FSR") sensor to measure the force/stress applied to the touchscreen device 150, a multi-touch touch sensor to detect the location of touch input(s) in the user's single or multiple touch interactions, and/or a multi-touch pressure sensor to measure the pressure applied under each touch location. In some embodiments, the sensor 154 may include a temperature or humidity or atmospheric pressure sensor to capture environmental conditions, an accelerometer or gyroscope or magnetometer to characterize the motion, velocity, acceleration and/or orientation of the device, or a microphone to capture the user's voice command or environmental audio information. In addition, the sensor 154 may include a wireless transmitter to receive or transmit information from/to other devices wirelessly.

In various embodiments, the haptic output device 160 is configured to provide haptic feedback to the user of the system 100 while the user is in contact with a least a portion of the system 100. For example, the haptic output device 160 may provide haptic feedback to the touchscreen device 150 itself to impose a haptic effect when the user is in contact with the touchscreen device 150 and/or to another part of the system 100, such as a housing containing at least the input/output devices 130. As discussed in further detail below, the haptic effects may be used to enhance the user experience when interacting with the system 100.

The haptic feedback provided by the haptic output device 160 may be created with any of the methods of creating haptic effects, such as deformation, kinesthetic sensations, vibration, electrostatic or ultrasonic friction, etc. In an embodiment, the haptic output device 160 may include non-mechanical or non-vibratory devices such as those that use electrostatic friction ("ESF"), ultrasonic surface friction ("USF"), or those that induce acoustic radiation pressure with an ultrasonic haptic transducer, or those that use a haptic substrate and a flexible or deformable surface, or those that provide thermal effects, or those that provide projected haptic output such as a puff of air using an air jet, and so on. The haptic output device 160 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber ("MCF") actuator, an electro-static actuator, an electro-tactile actuator, and/or another type of actuator that provides a physical feedback such as vibrotactile feedback. Multiple haptic output devices 160 may be used to generate different haptic effects.

The processor 110 may be a general-purpose or specific-purpose processor or microcontroller for managing or controlling the operations and functions of the system 100. For example, the processor 110 may be specifically designed as an application-specific integrated circuit ("ASIC") to control output signals to the haptic output device 160 to provide haptic effects. The processor 110 may be configured to decide, based on predefined factors, what haptic effects are to be generated based on a haptic control signal received or determined by the processor 110, the order in which the haptic effects are generated, and the magnitude, frequency, duration, and/or other parameters of the haptic effects. The processor 110 may also be configured to provide streaming commands that can be used to drive the haptic output device 160 for providing a particular haptic effect. In some embodiments, the processor 110 may actually include a plurality of processors, each configured to perform certain functions within the system 100. The processor 110 is described in further detail below.

The memory device 120 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 160 is to be driven, or other information for generating haptic effects.

Figure 2:
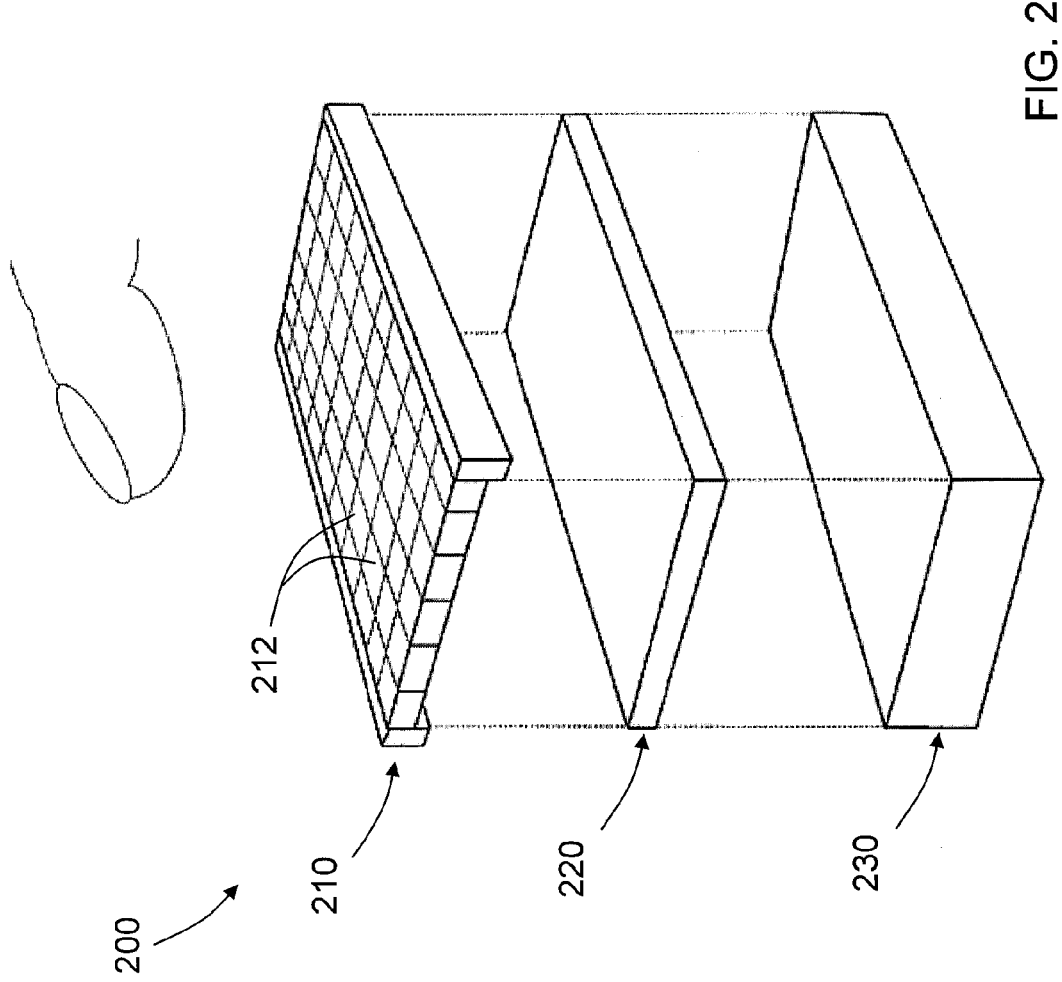
FIG. 2 is a schematic exploded view of an embodiment of the system of FIG. 1 in the form of a user interface.

FIG. 2 illustrates an embodiment of the system 100 of FIG. 1 in the form of a user interface device 200. As illustrated, the user interface device 200 includes a touchscreen device 210, a display 220, and a housing 230. In an embodiment, the touchscreen device 210 may be made of substantially transparent materials so that images output by the display 220 may be seen through the touchscreen device 230. The display 220 may be any type of display such as a cathode ray tube ("CRT"), liquid crystal display ("LCD"), light emitting diode ("LED") display, plasma display, flat panel display, flexible display or the like. The touchscreen device 210 and the display 220 may be installed together within the housing 230. In an embodiment, the touchscreen device 210 and the display 220 may be integrated into the same unit or device. In an embodiment, the user interface device 200 may not include the display 220. In an embodiment, the user interface device 200 may be flexible, e.g. permanently conformed, bendable, foldable, or rollable.

In an embodiment, the touchscreen device 210 includes a flexible layer 402 (illustrated in FIG. 4A) and a plurality of haptic cells 212 arranged in an array or grid. The haptic cells 212 may be separated by borders 214, as illustrated in FIG. 3, which shows a schematic top view of the touchscreen device 210. In an embodiment, the haptic cells 212 may not be separated by borders and instead abut against each other. Each of the haptic cells 212 is configured to provide a haptic effect in response to an input independent of the other haptic cells 212. For example, when multiple contacts are depressed on the touchscreen device 210 substantially simultaneously, the haptic cells 212 may be configured to generate multiple haptic effects in response to the multiple contacts. The multiple contacts may be made by one finger or multiple fingers. The dimension or size of each of the haptic cells 212 may be configured to be less than 5 mm×5 mm, or less than 4 mm×4 mm, or less than 3 mm×3 mm, or less than 2 mm×2 mm, or less than 1 mm×1 mm.

Figure 4B:
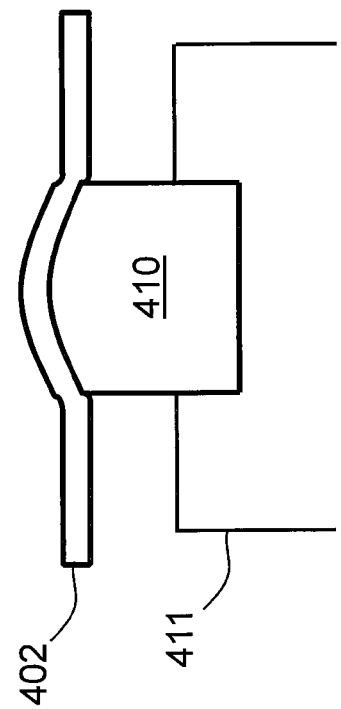
FIG. 4B is a schematic side view of the haptic cell of the user interface of FIG. 4A in a second, deformed state.
Figure 4A:
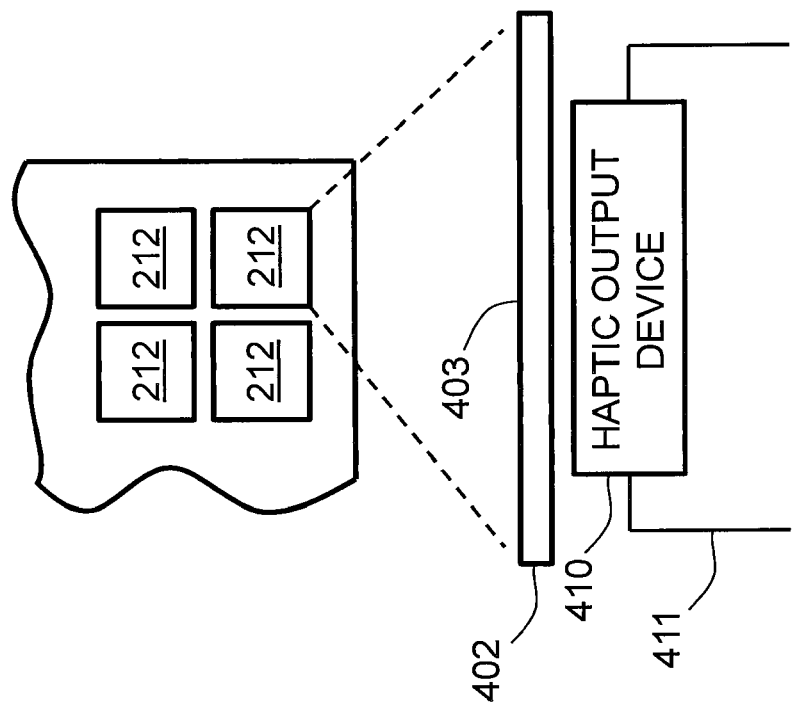
FIG. 4A is a schematic side view of a haptic cell of the user interface of FIG. 2 in a first state.

FIG. 4A illustrates a schematic side view of an embodiment of one of the haptic cells 212. The haptic cell 212 includes a haptic output device 410, and electrical connectors 411 that connect the haptic output device 410 to a power source and the processor 110 described above. The flexible layer 402 has a touch surface 403 configured to receive inputs from the user of the device and overlays the haptic output device 410, as illustrated. In an embodiment, the flexible layer 402 may overlay the entire array of haptic cells 212. In an embodiment, each haptic cell 212 may include a flexible layer 402 that is separate from the flexible layers 402 of adjacent haptic cells 212. In an embodiment, at least one of the sensors 154 described above may be embedded in or otherwise coupled to the flexible layer 402 such that the sensor 154 can detect a touch input at the touch surface 403 by the user.

The haptic output device 410 may include any type of haptic output device that may cause a deformation of the flexible layer 402 when energized by a power source, for example, any of the devices described above with respect to the haptic output device 160 of FIG. 1. For example, the haptic output device may include a micro-fluidic display, a piezoelectric material or a composite piezoelectric material, an electro-active polymer ("EAP"), a shape memory alloy, a micro-electro-mechanical system ("MEMS") device, which may include a MEMS pump, smart gels, electro/magneto-rheological fluids, a thermal fluid pocket, a resonant device, a variable porosity membrane, a laminar flow modulation device, and/or an electromagnetic actuator.

When the processor 110 outputs a haptic control signal to the haptic output device 410, as described in further detail below, the shape of the haptic output device 410 and therefore the haptic cell 212 may deform, as illustrated in FIG. 4B. The array of haptic cells 212 may be integrated into the touchscreen of mobile and tablet devices, with each haptic cell 212 configured to display (i.e. output) haptic effects over a wide range of frequencies, from quasi-static deformation to high frequency vibration. The mechanical assembly configurations and arrangement of the haptic cells 212 may allow for accumulating the force and displacement of adjacent haptic cells to create programmable smooth relieved (protrusion) or recessed (indentation) features, i.e., free form deformation, as described in further detail below.

Figure 5:
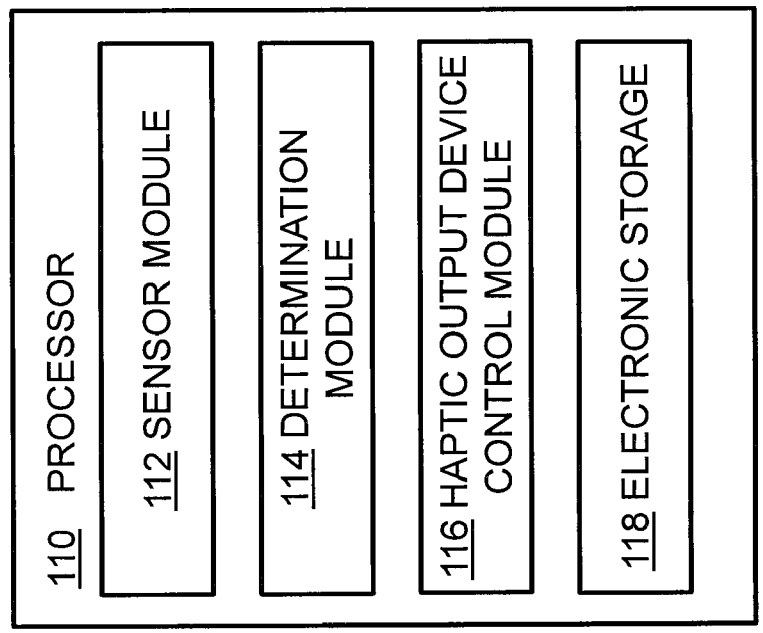
FIG. 5 is an embodiment of a processor of the system of FIG. 1.

FIG. 5 illustrates an embodiment of the processor 110 in more detail. The processor 110 may be configured to execute one or more computer program modules. The one or more computer program modules may include one or more of a sensor module 112, a determination module 114, a haptic output device control module 116, and/or other modules. The processor 110 may also include electronic storage 118, which may be the same as the memory device 120 or in addition to the memory device 120. The processor 110 may be configured to execute the modules 112, 114, and/or 116 by software, hardware, firmware, some combination of software, hardware, and/or firmware, and/or other mechanisms for configuring processing capabilities on processor 110.

It should be appreciated that although modules 112, 114, and 116 are illustrated in FIG. 2 as being co-located within a single processing unit, in embodiments in which the processor 110 includes multiple processing units, one or more of modules 112, 114, and/or 116 may be located remotely from the other modules. The description of the functionality provided by the different modules 112, 114, and/or 116 described below is for illustrative purposes, and is not intended to be limiting, as any of the modules 112, 114, and/or 116 may provide more or less functionality than is described. For example, one or more of the modules 112, 114, and/or 116 may be eliminated, and some or all of its functionality may be provided by other ones of the modules 112, 114, and/or 116. As another example, the processor 110 may be configured to execute one or more additional modules that may perform some or all of the functionality attributed below to one of the modules 112, 114, and/or 116.

The sensor module 112 is configured to receive an input signal from the sensor 154 that is generated when the sensor 154 detects an input from a user of the system 100 or user interface device 200. In embodiments in which there are multiple sensors, the sensor module 112 is configured to receive and process input signals from the multiple sensors. The sensor module 112 may be configured to determine whether the sensed input is an intentional input or merely an inadvertent touch to the touchscreen device 150, 210 by comparing the strength of the input signal to a predetermined threshold strength that corresponds to an intentional input. The sensor module 112 is also configured to send a signal to the determination module 114 for further processing.

The determination module 114 is configured to determine what was intended by the user when providing an input to the sensor 154. For example, the user may touch a certain location of the touchscreen device 150, 210 or provide a particular gesture to the touchscreen device 150, 210 that indicates that a certain function is to be performed by the system 100. The determination module 114 may be programmed with a library of predetermined gestures and touch locations on the touchscreen device 150, 210 so that when the user touches a particular location on the touchscreen device 150, 210 or provides a gesture to the touchscreen device 150, 210, the determination module 114 may determine a corresponding output. In addition, the determination module 114 may also output a signal to the haptic output device control module 116 so that a haptic effect in accordance with embodiments of the invention described below may be provided to the user.

The haptic output device control module 116 is configured to receive the output signal from the determination module 114 and determine the haptic effect to be generated by the haptic output device 160, based on the signal generated by the determination module 114. Determining the haptic effect may include determining the type of haptic effect and one or more parameters of the haptic effect, such as amplitude, frequency, duration, etc., of the haptic effect that will augment, for example, a tangible user interface element, such as a control button, as discussed in further detail below.

Figure 6:
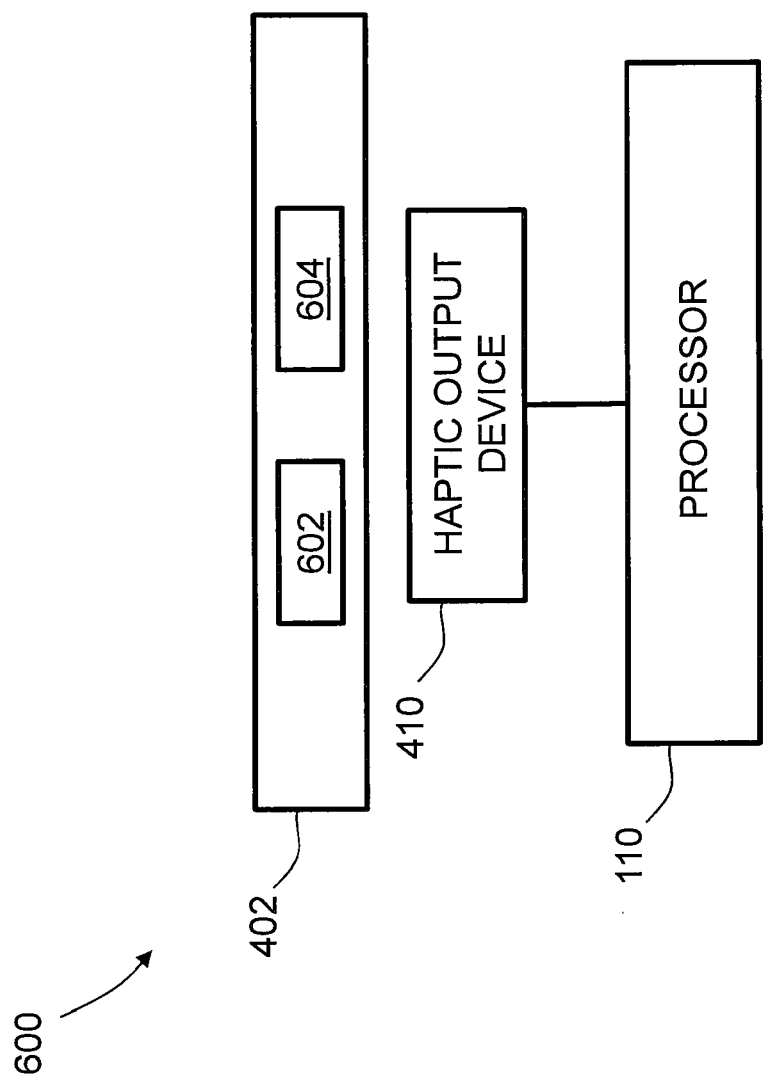
FIG. 6 is a schematic side view of an embodiment of the haptic cell of the user interface device of FIG. 2.

In an embodiment, the user interface 200 may include an impedance display 600, a portion of which is illustrated in FIG. 6, that uses a combination of pressure sensing, deformation/displacement sensing, deformation rate/displacement rate, and/or deformation display functionalities of the array of haptic cells 212 to simulate the mechanical impedance/stiffness of an object or medium in the virtual environments being displayed by the display 220 of the touchscreen device 210. In an embodiment, the impedance may be rendered through force control schemes that close the loop with position feedback, as described in further detail below. Implementations of such an embodiment provide the ability to display hard vs. soft object interactions in gaming applications, augmented reality applications, medical applications, handshake communications, etc.

The mechanical properties of most physical objects, in terms of the resistance displayed against deformation, may be characterized using stiffness (k) and damping ($\lambda$) parameters. For example, in an embodiment of the invention, the interaction of a user's finger may be described in terms of the amount of deformation of the flexible layer 402 incurred (represented by "x") and the rate of the deformation (represented by "v"), at each moment in time. In this embodiment, the amount of deformation (x) and/or the rate of deformation (v) may be measured by a displacement sensor 602, such as a strain gauge, etc., embedded in or otherwise coupled to the flexible layer 402. The resistance being displayed to the user (represented by "Fr") may be measured using a pressure sensor 604 embedded in or otherwise coupled to the flexible layer 402. To simulate a certain material, the desired resistance (represented by "F") displayed against the user's movement should follow equation (1):

$$F = k^* x + \lambda^* v \qquad (1)$$

In this embodiment, the processor 110 may be programmed so that the resistance displayed to the user (Fr) is substantially equal to the desired resistance (F) displayed against the user's movement in accordance with equation (1). For example, if the value of F is less than the value of Fr, the processor 110 may output a haptic control signal via the haptic output device control module 116 to the haptic output device 410 to increase the resistance of the flexible layer 402, for example by applying a higher voltage to the haptic output device 410, until F=Fr. Similarly, if the value of F is greater than the value of Fr, the processor 110 may output a haptic control signal to the haptic output device 410 to decrease the resistance of the flexible layer, for example by applying a lower voltage to the haptic output device 410, until F=Fr. The constant measuring of Fr by the pressure sensor and the amount of displacement (x) and/or rate of displacement (v) by the displacement sensor, as well as calculating the value of F may be completed in a closed control loop executed by the determination module 114 of the processor 110. In an embodiment, the values of k and $\lambda$ may be constant and based on the desired feel of the resistance. In an embodiment, the values of k and $\lambda$ may be a function of the amount of deformation (x) and/or deformation rate (v) at each moment in time.

For example, in an embodiment, it may be desirable to simulate the feel of honey if the display 220 is displaying an image of honey. Because of the viscoelastic properties of honey, it is desirable to output a higher amount of resistance if the rate of deformation is relatively high and a lower amount of resistance if the rate of deformation is relatively low, which would give the user the feel as if he/she was pressing against honey. The processor 110 may be programmed with stiffness (k) and damping ($\lambda$) coefficients as a function of deformation rate (v) so that a more realistic effect may be experienced by the user. As another example, the processor 110 may be programmed to simulate a change in physical condition of an object being displayed by the display 220 as the user presses against the touch surface 403. For example, if the item being displayed is brittle, when the user begins to press against the touch surface 403, the resistance being displayed to the user may be relatively high to simulate a hard object, but when the object "breaks", the resistance may be sharply decreased to simulate the breaking of the object.

In an embodiment, the touch surface 403 of the flexible layer 402 may simulate a physically realistic user interface feature, such as a button or a joystick, which emerges from the touch surface 403, as illustrated in FIG. 4B. The user may move the joystick in a direction tangent to the touch surface. In this embodiment, the processor 110 may be programmed to display programmable kinesthetic haptics via the haptic output device 410 in the form of a resistive force against the user's motion parallel to the touch surface 403. Similar to the embodiment described above, a predetermined stiffness (k) and damping ($\lambda$) may be associated with moving the joystick. The amount of deformation (x) and/or the rate of deformation (v) may be measured using the embedded displacement sensor 602, and the resistance displayed against the user (Fr) may be measured using the pressure sensor 604. If the measured force displayed against the user (Fr) is smaller than the desired force F, as calculated using equation (1) above, to be displayed against the user, the processor may increase the resistance by, for example, applying a higher voltage to the haptic output device 410 to match F with Fr, and vice-versa, as described above.

In some embodiments, the user may touch the touch surface 403 at a location that is not directly over a single haptic cell 212 but instead is in between haptic cells 212, such as on the boarder 214, or is over a plurality of haptic cells 212, depending on the size of the haptic cells 212. In such situations, the processor 110 may use appropriate interpolation techniques to replicate a sensation that the user is directly over a single haptic cell 212. For example, when the user's finger is placed between two haptic cells 212, the haptic rendering may consist of partially actuating the haptic output devices 410 of both cells 212 in order to replicate the sensation that the user is on a single cell 212. Implementations of this embodiment may provide the user with an increased perceived haptic resolution. In addition, implementations of this embodiment may enable between-cell transition effects for information display at the sub-finger level, customized deformation feature size, such as for displaying skin stretch effects, etc.

In an embodiment, the processor 110 may be programmed to control the haptic output devices 410 of adjacent haptic cells 212 in a sequence so that a sense of movement or flow may be displayed and a sensation similar to a physical wave may be generated. For example, if the user touches the touch surface 403 and slides his/her finger across the touch surface 403, the processor 110 may generate haptic control signals in response to the sensed touches so that the haptic output devices 410 of a plurality of haptic cells 212 are sequentially actuated from a location corresponding to the initial touch to a location corresponding to the end of the touch so that the user will feel as if an object is continuously moving across the touch surface. In an embodiment, the shape of the wave and the travelling pace of the wave may be a function of the properties of the material that is being simulated by the touchscreen device 210. In an embodiment, ripples may be created by having multiple haptic output devices 410 located circumferentially around the location of a touch input move in sequence away from the location of the touch. Such sequential activation of multiple haptic output devices 410 may be used to create flow-like motion, traveling waves, and/or ripples, which may augment rotation and translation motion on the display 220, such as creating a vortex or a ripple shape, such that the center may be identified as the source of an event or notification.

In an embodiment, the processor 110 may be configured to control the array of haptic cells 212 with superimposed haptic control signals in a way that the flexible layer 402 may kinaesthetically deform at specific locations, and at the same time provide vibrotactile stimulus. For example, in an embodiment, the processor 110 may output a haptic control signal to the haptic output device 410 of at least one haptic cell 212 to generate a button via kinaesthetic deformation, and then when the sensor senses the user has pressed the location of the flexible layer 402 corresponding to the generated button, the processor 110 may output another haptic control signal to the haptic output device 410 to generate and a click confirmation via a vibro-tactile effect.

Figure 7:
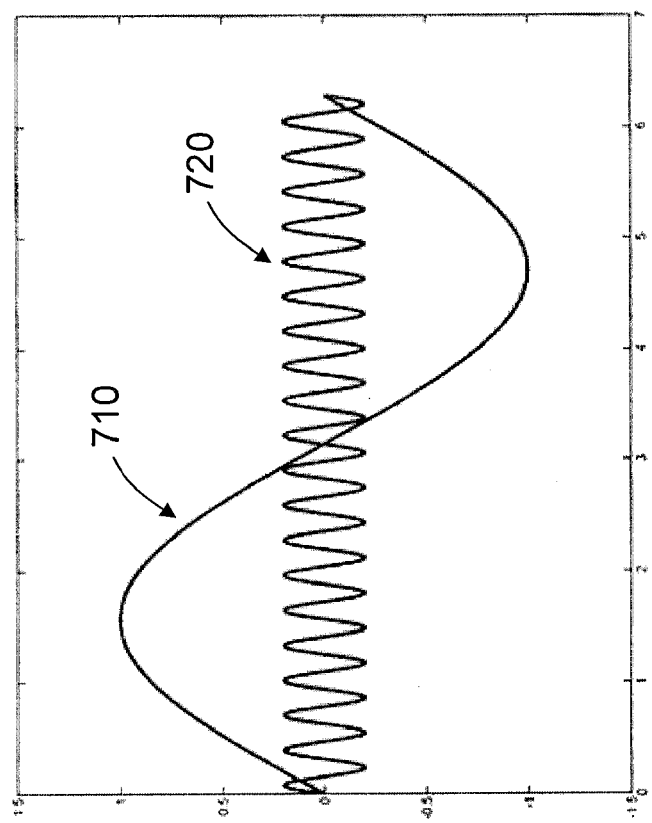
FIG. 7 is an illustration of voltage as a function of time for two different haptic control signals for driving a haptic output device of the haptic cell of FIG. 4A.
Figure 8:
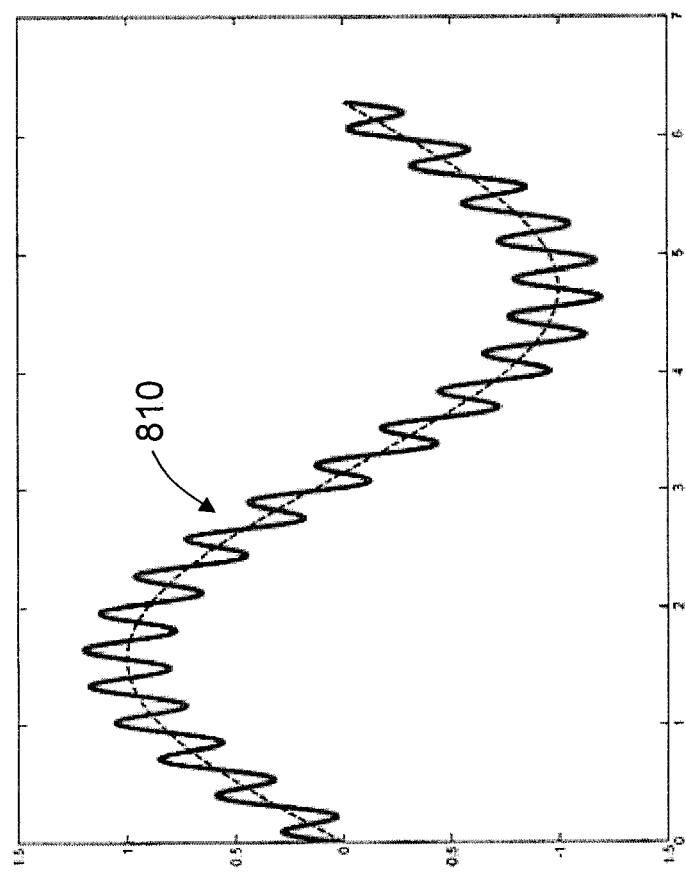
FIG. 8 is an illustration of voltage as a function of time for a single haptic control signal for driving the haptic output device of the haptic cell of FIG. 4A.

In an embodiment, the haptic control signal output by the processor 110 may consist of two components with different characteristics. First, as illustrated in FIG. 7, a low frequency and large magnitude sinusoid 710 may be generated, which if played by itself may create a low frequency deformation in each haptic cell 212 so that the haptic cell 212 may move up and down in the center. Second, a high frequency and low magnitude signal 720 may be generated, which if played alone may result in high frequency vibrations in the haptic cell 212 and may be perceived as vibrotactile feedback. If the haptic output signal is a combination of the low frequency and large magnitude sinusoid 710 and the high frequency and low magnitude signal 720, illustrated as signal 810 in FIG. 8, the haptic cell 212 may display kinesthetic haptic deformation and, simultaneously, vibrotactile haptics.

In an embodiment, the plurality of haptic cells 212 may be used to generate isolated vibration effects for multi-output applications responding to multiple inputs. In an embodiment, the plurality of haptic cells 212 may be used to simulate a guitar application in which both the macro deformations and the high frequency (micro-level) vibrations associated with the strings may be displayed.

In an embodiment, the array of haptic cells 212 may be used to physically simulate a tangible touchscreen keyboard and physically augment the text entry/keyboard interactions in touchscreen mobile and tablet devices. In other words, the array of haptic cells 212 may be used to physically display each key or the edges between the keys of a keyboard in a text entry application. Other tangible features may also be simulated to augment the key display. For example, the F and J keys may be haptically marked, as they are in some physical keyboards, to facilitate typing, or upon holding the modifier keys (e.g., CTRL), certain keys with predefined functions may be haptically highlighted (e.g., CTRL+C, CTRL+B, CTRL+V, etc.). The travel stroke and the force profile associated with each key may be tuned and adjusted so that it has the geometry, travel, and force profile identical to that of a real button to enhance the fidelity and accuracy of the text entry/typing experience, as compared to interaction with a real keyboard. In addition, the keys may be shaped to make the keyboard more ergonomic, such as rounded towards thumbs, etc.

In an embodiment, the array of haptic cells 212 may be used to enhance the interaction of the user with a list of items (e.g., list scrolling) by raising or recessing items in a scrolled or static list, thereby facilitating selections and increasing realism. For example, each item in a static list may be raised so that the user's fingertip feels the transitions as the fingertip slides from one to the next. In addition, marked items, such as "favorites" may have a different shape, texture, or vibrotactile feedback, and transitions between groups of items (e.g., categories, alphabetic groups) may also be highlighted with a distinct feature, such as a raised or recessed line. Similar deformations may be applied to a scrolled list such that the shape would be felt by lightly touching the list and feeling items slide by.

In an embodiment, the array of haptic cells 212 may be used to physically augment and thus facilitate manipulating objects in a virtual environment, as it allows the user to physically interact with a protrusion or recession "tied" to the object. Such a capability may render the interaction more realistic because it provides a perception that is similar to real world object interaction scenarios. In addition, the force profile associated with such interactions may be programmable, as described above, which may allow for a richer haptically enabled user interface that is capable of displaying a wide range of data about the object and its properties. Examples of user interactions that may benefit from this embodiment include, but are not limited to moving/pushing the protrusion (or recession) overlaid on and tied to a certain user interface element, such as widgets, application icons, files, folders, etc., across the screen. Small user interface widgets, such as resize handles, that are often visually occluded by the finger once deformed may be detected and manipulated through the touch kinaesthetic feedback. In a similar example, the user may feel/explore the edges of a digital drawing in such a way that that shapes can, for example, be filled (i.e. virtually painted) without spilling over, even when the finger occludes the edge. As another example, the display of interactions between a dragged object and other contents on the screen may be felt via embodiments of the invention. For example, a moving line may be felt through a raised icon as it is moved over a window's edge. In a similar example, while the user is dragging an object, the object may hit a barrier and cannot be moved any further. Embodiments of the invention may be used with text manipulation. For example, overlaying deformation features on top of a piece of text may facilitate text manipulation and address the visual occlusion problem in text interactions, and operations such as move, copy, and paste may be performed by physically interacting with the deformation feature overlaid on top of the text. The same functionality may also be used when a virtual object moves on its own (e.g., under the effect of virtual gravity) so that the user may feel it moving in that direction.

In an embodiment, the array of haptic cells 212 may be used to simulate a physical controller in the touchscreen device 210. For example, deformation features may be raised from the flat touch surface 403 to represent standard physical user interface controls, such as a D-Pad. The array of haptic cells 212 may not only simulate the physical shape of the D-pad, but may also replicate the experience of the user when interacting with a real controller. For example, if the left side of the D-pad is pressed down, the haptic cells 212 under the user's finger may move down while the haptic cells 212 on the right side may move up, which renders the interaction similar to that with a real D-pad controller. In an embodiment, a raised feature that the user can interact with may be provided to simulate a two dimensional ("2D") joystick, an interactive game console, or track point found on laptop computers, for example.

In an embodiment, the array of haptic cells 212 may be used to simulate physical textures, such as textures found in real life, at the macro scale. Small deformations of the haptic cells 212 may be used to produce textures ranging from sand to glass.

In an embodiment, the array of haptic cells 212 may be used to enable non-visual user interface interactions and gestures by providing deformation to facilitate gestures performed without visual examination and also to provide haptic feedback. For example, finger guidance may be facilitated by creating pathways on the touchscreen 210 that guide user's finger towards a certain target location, and then block the finger when the finger reaches the target spot. More generally, embodiments of the invention may allow the user to "snap" to a certain grid or shape. For example, in a drawing application, such functionality may create the trace of a shape, but at the same time allow the user to not follow the shape if desired. In an embodiment in which the user interface device 200 is a phone, the user may answer a call by interacting with the phone in his/her pocket through inspection of a deformation feature that represents a target functionality, such as answer the phone, hang up the phone, transfer to a wireless headset, etc. Similarly, predefined messages may be sent without having to look at a touchscreen by being able to feel simulated tangible features of the touchscreen for guidance.

The programmable deformation display described above may also be used to enable a wider range of novel gesture interactions, which may lead to a richer gesture language. For example, the user may enter spatial information by manipulating the touch surface 403 as if the flexible layer 402 was made of clay or another similar material. In an embodiment, the user may manipulate/alter the elevation in a map, brightness in an image (either locally on an isolated portion of the image or globally all over the image), may create distortions in an audio signal by manipulating parameters mapped to a two-dimensional surface, or may create a mark in the simulated clay to mark a certain content, such as a document.

Embodiments of the invention may also be used to haptically augment free space gestures with deformation. For example, in an embodiment, the user interface device 200 may be moved in six degrees of freedom, and deformation haptic effects representing various pieces of information may be played. For example, the user may swing the user interface device 200 from left to right or rotate the user interface device 200 at discrete angles, and a bump haptic effect may be played or a deformation haptic texture may be displayed via the touchscreen device 210. In an embodiment, the interaction with objects bigger than the user interface device 200 may be enabled using the array of haptic cells 212. The deformation on the touchscreen device 210 may give the user the ability to explore or feel a virtual object by receiving haptic information about only parts of the object (depending on the spatial location and the grasping orientation, the information displayed might be different). Similar to the exploration of a sphere with a hand, the array of haptic cells 212 may display the shape of a virtual object, which may be felt by the hand at the specific locations as if the user was touching it. In an embodiment, other properties such as softness and temperature may be displayed by the touchscreen device 210.

In certain gestural expressions/communications, the location, dynamics, and motion patterns of the deformation features (relief/recession) does not have to be exactly the same as those of the user's finger during interaction. For example, in an object manipulation scenario, the user may select the object (and as a result a protrusion is created over the object), and then tap on another point on the touchscreen device 210, where a second protrusion may be displayed. The user may then choose either to use the collocated protrusion (the one on top of the object), or the un-collocated protrusion to push the object across the screen. In another example, instead of pushing on a single protrusion that has emerged on top of the image of the object, the user may place his/her finger between two or more protrusions located along the boundary lines of the image and move the protrusions around with the object.

In an embodiment, the array of haptic cells 212 may display a variety of content/meta data through at least one programmable deformable "button". Such a physical button may adopt various geometries, form factors, travel strokes and haptic force profiles, thereby allowing for customized button interaction and confirmation experiences. The specific force profile (resistance, dynamic inertia, detents, etc.) or click profile (in single press) of the button may be used to convey a variety of meta data to the user interacting with the button. Examples of similar applications include: a blinking button indicating a required pending action, a button that cannot be pressed down (or is recessed) unless it is active, or a button showing affordance or interaction themes with its shape. For example, the slanted shape of a button may indicate that the button should be pushed sideways. In an embodiment, a multi-function button may be configured to change its shape to indicate a new functionality. For example, as the user presses down on a flat button, the button may become rounded to show that the button may now be used as a slider. The user can then slide the button along the surface.

In an embodiment, content information may be displayed through a touchscreen full keyboard, described above, using the array of haptic cells 212. For example, haptic key magnification with proximity sensing may be provided so that when a proximity sensor at or in the flexible layer 402 senses motion of a finger approaching a certain key on the touchscreen device 210, only the key/set of keys close to the finger's target point may be raised (i.e. haptically displayed with deformation). In an embodiment, only the keys that are most likely to be hit next, based on text prediction, may be physically deformed. The programmable deformation may allow key edges to be made harder or softer, or button shapes or compliances to be changed, depending on the user's preference. In an embodiment, the keys that have a useful function in the current user interface may be raised, while the keys that do not have an immediate useful function or are inactive may be recessed.

In an embodiment, the visual content displayed on by the display 220 may be augmented with certain sensory or meta data, where the additional/augmenting information is displayed in the form of deformation of the touchscreen device 210 superimposed on top of the image displayed by the display 220. For example, such additional information may be the image's "visual" characteristics, such as contrast, brightness, full spectrum photography, etc.

In an embodiment, "non-visual" information in the form of deformation features (e.g., protrusion, recession, etc.) may be used to augment certain characters (e.g., in a movie, game, etc.) in the virtual environment. For example, in a gaming application, the game's character equipment, health status, or the location and size of troops deployed on a map may be augmented (highlighted) with deformation. Such deformation features, in addition to associating certain tactile sensations to the target character(s), may alter its (their) visual appearance(s) as well. The latter may occur if, for example, the array of haptic cells 212 form a concave or convex shape on top of the character and thus locally change the effective optical properties of the screen. Using this method, it may be possible to have some areas (characters) in the virtual environment appear blurry/diminished, while some others appear brighter/enhanced. In an embodiment, certain areas of the user interface device 200 may be used to display different audio data/sound to the user by generated isolated vibrations with the array of haptic cells 212 across the touchscreen device 210.

In an embodiment, Braille language features for the visually impaired may be displayed by, for example, turning the entire touchscreen device 210 into a Braille display. Each Braille cell, representing a character, may be made up of an array of 2 by 4 dots, arranged in a rectangle-like form factor, and users may select the size of the Braille cells, or other properties. In an embodiment, "tactile graphics" for the visually impaired may be provided with the touchscreen device 210.

In an embodiment, deformation-based haptics via the array of haptic cells 212 may be used to display information to the user in a non-visual manner, thereby minimizing the need to visually explore the touchscreen device 210. For example, the results of a search task (text, webpage, etc.) may be displayed using relief/recession features. The search results may be physically "highlighted" through relief/recession, thereby allowing the user to locate them by simply examining the touch surface 403. This may be done, for example, by either exploring the screen using fingers, or by putting the full palm of a hand on the screen to locate the haptically highlighted item(s). In an embodiment, information such as caller ID or message sender ID may be encoded into relief/recession features, thereby allowing the user, for example, to identify the caller while his/her phone is still in his/her pocket. In an embodiment, GPS route guidance information may be displayed on the touchscreen device 210 by simulating the road, the intersections, and the next road to turn on in the form of physical pathways, and the car itself may be represented by a moving protruded block.

In an embodiment, the array of haptic cells 212 may be used to convey certain meta data as the user is involved in manipulation of user interface elements or objects in a digital environment. For example, while the user is trying to manipulate virtual objects, which are physically simulated using the array of haptic cells 212, a programmable force display in the form of adjustable resistance against motion (e.g., stick, slip, detent effects, etc.) during manipulation/moving of the user interface elements may convey information about the type, size, and other properties of the object. In addition, protrusion or recession deformation may be used to indicate whether grasping or selection of the object has been successful or not. For example, when a portion of text displayed by the display 220 is selected or highlighted, the portion of selected/highlighted text may have a protrusion or recess deformation on top of it via the deformation of the haptic cells 212 associated with the location of the selected/highlighted text.

Embodiments of the invention may be used for branding application in which the touchscreen device 210 may be configured to display haptic effects that may be designed, customized, and arranged in the form of a haptic "signature" of, or meta data representing, a specific OEM. For example, as the user interface device 200 is turned on, a specific haptic pattern or signature may displayed, which may include the display of relevant static or dynamic relief/recess information of the corresponding OEM. In an embodiment, the logo of the target OEM may be statically displayed as well.

In an embodiment, the systems and methods described may be used for remote information display functionality. For example, the array of haptic cells 212 may generate large static deformation that may be visually detected or examined or analyzed remotely, without the need for holding or touching the user interface device 200. Information such as caller ID, clock, calendar date, etc., if displayed with a static relief display, may be accessed by simply looking at the user interface device 200 even when the user interface device 200 is sitting at a fairly far distance away from the user.

Embodiments of the invention may also be implemented on a wearable device, in which silent notifications in specific contexts may be displayed to convey certain information when the wearable device is pressed against the body. In an embodiment, a watch may communicate time by creating dimples on its underside and pushing against the skin of the wearer's wrist. In an embodiment, a bracelet may be configured to communicate an alarm by generating waves and other patterns on the skin of the wearer. In an embodiment, a shoe may be configured to create a dimple against the wearer's foot to indicate the direction in which he/she should walk.

Embodiments of the invention may also be implemented in medical devices. For example, the inside of a laparoscopic handle may have an array of haptic cells 212 that may display, to the surgeon, pressure sensation relating to a measured bio-signal during the operation, such as heart rate, etc.

In an embodiment, a range of status information related to ambience, user, phone, etc., may be communicated using the array of haptic cells 212. For example, while on a phone call with the touchscreen device 210 in contact with a cheek or jaw, deformation-based alerts that may indicate the battery status or service drop may be displayed on user's skin. In addition, even with a phone in a pocket, the user may query information such as number of missed calls, received messages, or upcoming events in the calendar by tapping on the touchscreen device 210 and receiving feedback encoded in the form of deformation features provided by the array of haptic cells 212. In an embodiment, deformation of the array of haptic cells 212 may be used to display ambient information, such as barometric pressure, temperature, compass directions, etc. In an embodiment, deformation of the array of haptic cells 212 may be used for social ambience awareness and convey information such as the number and/or location of people with certain commonalities.

Embodiments of the present invention described above may restore the lost realism/tangibility of user interface elements by physically augmenting the user interface components and associated interactions with deformable haptic cells, which may enable richer, more intuitive and less cognitively loading interactive experiences. A tangible user interface may also lead to more efficient and less erroneous interactions, for example, by enabling a tangible keyboard for text typing.

One of the potential challenges in implementing deformation displays in commercial devices is the cost of high-resolution (i.e. large number of cells per area) arrays of haptic cells. By interpolating between force profile/effects between cells, as described above, it may be possible to simulate fairly fine haptic resolutions, even with a coarse array of deformable haptic cells.

Embodiments of the present invention described above provide systems, methods and underlying considerations for rendering and controlling haptically augmented tangible user interfaces and content/information displays. The above-described embodiments provide various control and rendering schemes, taking user input and haptic output into consideration, designed around implementing an array of deformable haptic cells, to effectively display different types of haptic information and enable intuitive tangible user interfaces. The above-described methods may expand the functionalities and increase the effectiveness of the array of deformable haptic cells, such as increased perceived resolution, etc., and remove the need for more sophisticated and costly hardware.

Embodiments of the invention described above provide rendering and control schemes that may be used to command an array of deformable haptic cells to enable tangible user interface interactions and content/meta data display. Embodiments of the invention described above provide systems and methods to display digital content and meta data using an array of deformable haptic cells, and thereby enable richer, more informative, and more intuitive interactive experiences. Embodiments of the invention described above provide innovative techniques for employing a haptically-enabled and programmable array of deformable haptic cells to display content/information/meta data in a tangible, realistic, and efficient manner. The above-described embodiments may also increase the range of applications of the array of deformable haptic cells and expand the breadth and depth of the haptic information that the user interface device can deliver.

Embodiments of the invention described above provide a new output dimension based on programmable free form deformation that is capable of displaying content and meta data in a more realistic, tangible, and intuitive manner. The use of deformation, as another haptic-based content display dimension, expands the breadth and depth of information display medium and enriches data transfer bandwidth.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A user interface device comprising:
a flexible layer comprising a touch surface configured to receive a touch by a user;
a plurality of haptic cells covered by the flexible layer, each haptic cell comprising a haptic output device;
a sensor configured to sense an amount and/or rate of deformation of the flexible layer when a user touches the touch surface;
a pressure sensor configured to sense a resistance displayed by the haptic cell to the user at the touch surface; and
a processor configured to receive output signals from the sensor and the pressure sensor, generate a haptic control signal based on the output signals from the sensors, the haptic control signal having electrical characteristics, output the haptic control signal to at least one haptic output device of the plurality of haptic cells to cause the haptic output device to deform an associated haptic cell in response to the sensed deformation of the flexible layer and change at least one electrical characteristic of the haptic control signal based on the sensed resistance displayed by the haptic cell, the at least one electrical characteristic being selected from the group comprising magnitude, frequency, or duration, the changed haptic control signal controls the haptic output device to modify the resistance of the flexible layer to a desired resistance.

2. The user interface device according to claim 1, wherein the processor is configured to output a plurality of haptic control signals to a plurality of haptic output devices located in proximity to one another to collectively create a haptic effect.

3. The user interface device according to claim 2, wherein the haptic effect simulates a button or joystick.

4. The user interface device according to claim 2, wherein at least two of the plurality of haptic output devices create different amounts of deformations of their associated haptic cells to create the haptic effect.

5. The user interface device according to claim 1, wherein the processor is configured to generate a plurality of haptic control signals based on the output signal from the sensor and output the haptic control signals to a plurality of haptic output devices sequentially to create a haptic effect.

6. The user interface device according to claim 5, wherein the haptic effect simulates a wave or a ripple.

7. The user interface device according to claim 5, wherein the haptic effect simulates movement of a joystick.

8. The user interface device according to claim 5, wherein the haptic effect simulates movement of a slider.

9. The user interface device according to claim 1, wherein the processor is configured to generate a second haptic control signal different than the haptic control signal and output the second haptic control signal to the haptic output device to cause the haptic output device to output a vibrotactile haptic effect.

10. A method comprising:
sensing an amount and/or rate of displacement of a flexible layer of a user interface device with a sensor;
sensing a resistance displayed by a haptic cell to a user of the user interface device with a pressure sensor;
generating a haptic control signal based on the sensed amount and/or rate of displacement of the flexible layer with a processor, the haptic control signal having electrical characteristics;
deforming the haptic cell with a haptic output device based on the haptic control signal; and
changing at least one electrical characteristic of the haptic control signal based on the sensed resistance displayed by the haptic cell, the at least one electrical characteristic being selected from the group comprising magnitude, frequency, or duration, the changed haptic control signal controls the haptic output device to modify the resistance of the flexible layer to a desired resistance.

11. The method according to claim 10, further comprising generating a plurality of haptic control signals and deforming a plurality of haptic cells located in proximity to each other with a plurality of haptic output devices based on the plurality of haptic control signals to collectively create a haptic effect.

12. The method according to claim 11, wherein the haptic effect simulates a button or joystick.

13. The method according to claim 11, wherein at least two of the haptic cells are deformed by different amounts to create the haptic effect.

14. The method according to claim 10, further comprising generating a plurality of haptic control signals and sequentially deforming a plurality of haptic cells located in proximity to each other with a plurality of haptic output devices based on the plurality of haptic control signals to collectively create a haptic effect.

15. The method according to claim 14, wherein the haptic effect simulates a wave or a ripple.

16. The method according to claim 14, wherein the haptic effect simulates movement of a joystick.

17. The method according to claim 14, wherein the haptic effect simulates movement of a slider.

18. The method according to claim 10, further comprising generating a second haptic control signal different than the haptic control signal and generating a vibrotactile haptic effect with the haptic output device.

* * * * *